US010271368B2

(12) United States Patent
Sambe

(10) Patent No.: US 10,271,368 B2
(45) Date of Patent: Apr. 23, 2019

(54) COMMUNICATION APPARATUS HAVING PARALLEL WIRELESS CONNECTION, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Hideo Sambe, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/592,524

(22) Filed: May 11, 2017

(65) Prior Publication Data

US 2017/0339734 A1 Nov. 23, 2017

(30) Foreign Application Priority Data

May 23, 2016 (JP) ................................ 2016-102851

(51) Int. Cl.
*H04W 84/00* (2009.01)
*H04W 76/19* (2018.01)
(Continued)

(52) U.S. Cl.
CPC ........... *H04W 76/19* (2018.02); *H04W 48/14* (2013.01); *H04W 76/14* (2018.02); *H04W 76/15* (2018.02)

(58) Field of Classification Search
CPC ..... H04L 41/00; H04L 41/0273; H04L 67/02; H04L 67/125; H04L 67/16; H04L 69/16;
(Continued)

(56) References Cited

U.S. PATENT DOCUMENTS

2010/0260109 A1* 10/2010 Ulupinar ............. H04L 12/4633 370/328
2012/0110100 A1* 5/2012 Hiramatsu .......... H04L 61/2575 709/206
(Continued)

FOREIGN PATENT DOCUMENTS

JP 2015-002426 A 1/2015

*Primary Examiner* — Sai Aung
(74) *Attorney, Agent, or Firm* — Venable LLP

(57) ABSTRACT

A communication apparatus establishes, in parallel, a first wireless connection for connecting to a first target apparatus via an external apparatus and second wireless connection for directly connecting to a second target apparatus without the external apparatus. The communication apparatus includes a processor executing instructions to use a first communication protocol needing an anti-conflict measure or a second communication protocol not needing the anti-conflict measure. In a case where a first communication protocol is used, after the first wireless connection has been disconnected during the first wireless connection and the second wireless connection being maintained in parallel, information for stopping the communication is sent to the second target apparatus, and then reconnection processing with the first target apparatus is performed and the second target apparatus is notified of information related to reconnection. In a case where a second communication protocol is used, after the first wireless connection has been disconnected during the first wireless connection and the second wireless connection being maintained in parallel, reconnection processing is performed with the first target apparatus without notifying the second target apparatus of information related to reconnection.

28 Claims, 11 Drawing Sheets

(51) Int. Cl.

| | |
|---|---|
| ***H04W 48/14*** | (2009.01) |
| ***H04W 76/14*** | (2018.01) |
| ***H04W 76/15*** | (2018.01) |

(58) Field of Classification Search
CPC .. H04L 69/161; H04L 12/4633; H04W 8/005; H04W 28/06; H04W 40/22; H04W 40/32; H04W 76/045
See application file for complete search history.

(56) References Cited

U.S. PATENT DOCUMENTS

2013/0124737 A1* 5/2013 Tachibana ............... H04L 12/00 709/227
2014/0226530 A1* 8/2014 Tokunaga ............. H04W 8/005 370/255

* cited by examiner

F I G. 10
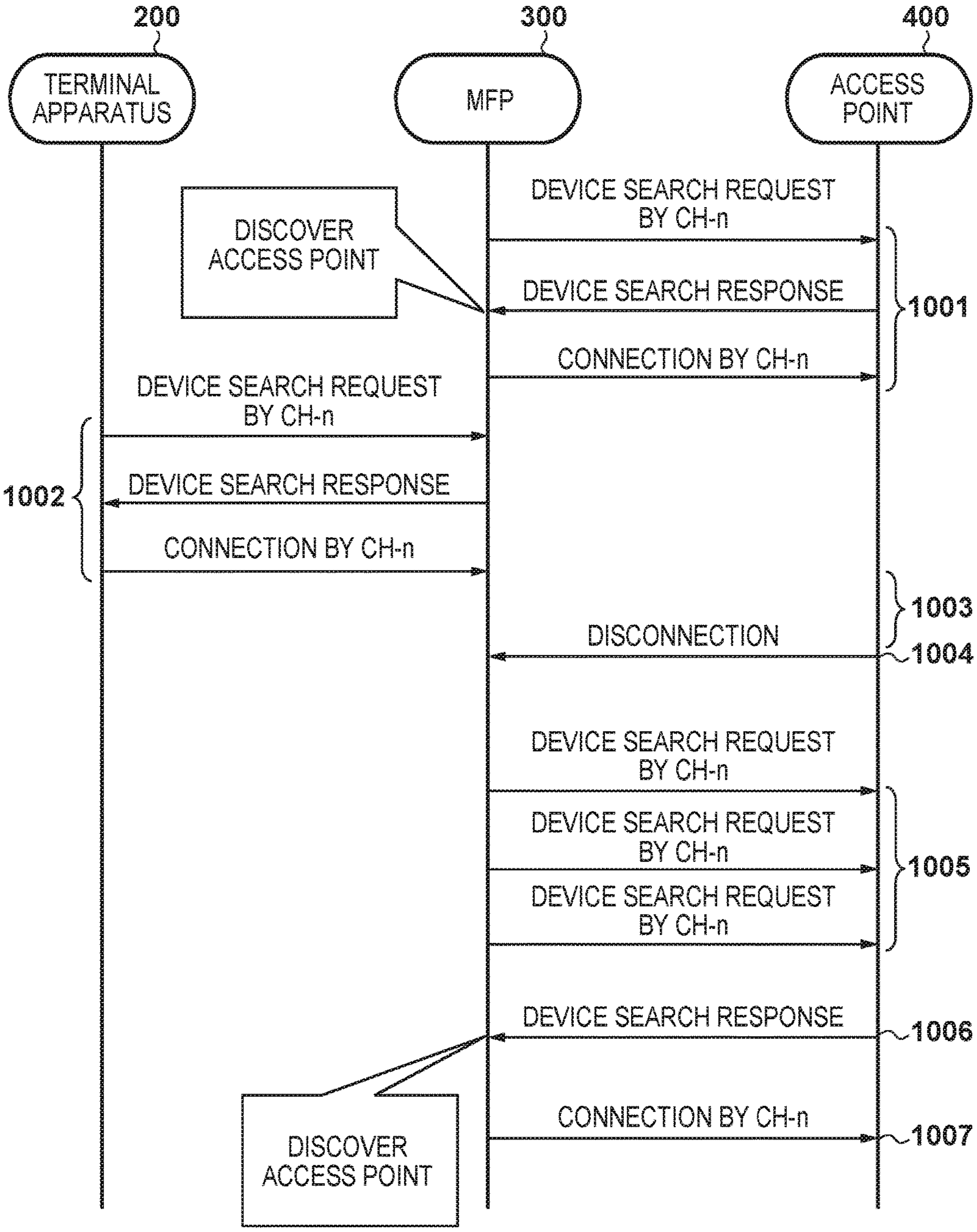

F I G. 12
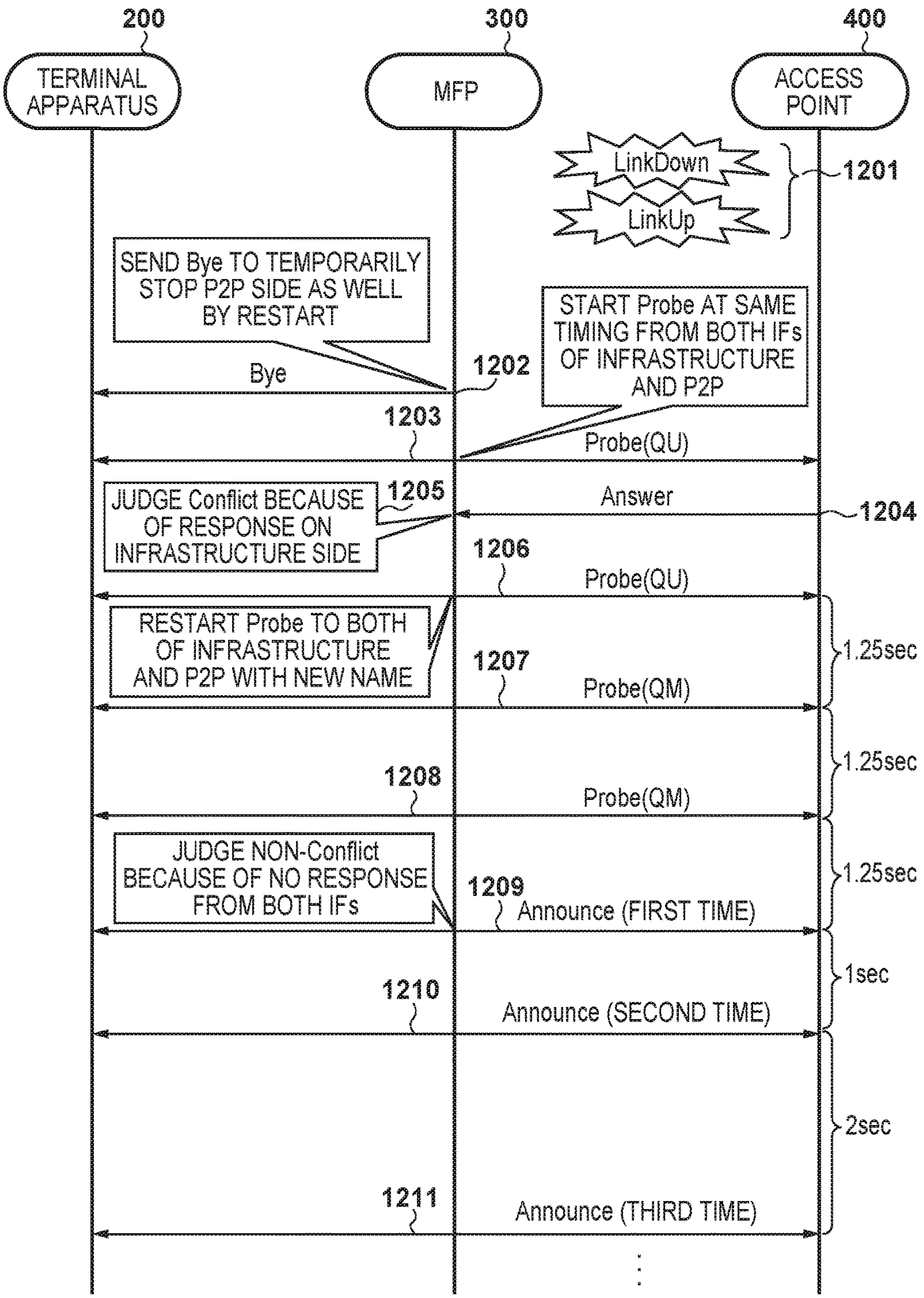

COMMUNICATION APPARATUS HAVING PARALLEL WIRELESS CONNECTION, COMMUNICATION METHOD, AND NON-TRANSITORY COMPUTER-READABLE STORAGE MEDIUM

BACKGROUND OF THE INVENTION

Field of the Invention

The present invention relates to a communication apparatus, a communication method, and a non-transitory computer-readable storage medium.

Description of the Related Art

A plurality of connection methods are known in a wireless communication system. More specifically, there is a method (for example, an infrastructure mode) by which a communication apparatus performs wireless connection with a target apparatus via an access point. There is also a method (for example, a peer-to-peer mode, to be referred to as a P2P mode hereinafter) by which the communication apparatus or the target apparatus operates as an access point and directly performs wireless connection between them. Further, there is known a communication apparatus capable of simultaneously (in parallel) establishing connection with the target apparatus via an external apparatus such as an access point and direct connection with the target apparatus without going through the external apparatus. Note that an operation of establishing two types of connections simultaneously (in parallel) as described above will be referred to as a simultaneous operation.

Japanese Patent Laid-Open No. 2015-002426 discloses a technique of performing wireless communications with a target apparatus simultaneously in a P2P mode and an infrastructure mode, and a technique of deciding, in accordance with a protocol used in one of the respective modes, a protocol used in the other mode.

Under circumstances where the communication apparatus executes the simultaneous operation, when one communication connection is disconnected and reconnected, a behavior toward the other communication connection needs to be performed appropriately.

For example, the first communication protocol that needs to take a measure against a conflict of service names to be announced and the second communication protocol that does not need an anti-conflict measure are used for the above-described connection. Note that an example of the first communication protocol is Bonjour, and an example of the second communication protocol is Windows Service Discovery (to be referred to as WSD hereinafter). If the second communication protocol that does not need the anti-conflict measure is used for connection between the communication apparatus and the communication target apparatus, the communication target apparatus sends an inquiry packet to the communication apparatus each time a command is issued from the communication apparatus. That is, in order to suppress redundant reception of the inquiry packets in the communication apparatus, the communication apparatus should restrain itself from sending the commands to the communication target apparatus as much as possible when connected to the communication target apparatus by using the second communication protocol.

SUMMARY OF THE INVENTION

In consideration of the above-described problem, the present invention implements efficient processing in a reconnection processing after disconnection of connection in a state in which simultaneous operations by a plurality of wireless communication methods are performed.

According to one aspect of the present invention, there is provided a communication apparatus capable of parallelly establishing first wireless connection for connecting to a first communication target apparatus via an external apparatus and second wireless connection for directly connecting to a second communication target apparatus without going through the external apparatus, the apparatus comprising: a control unit configured to control, if wireless connection with the first communication target apparatus is disconnected, and reconnection is made with the first communication target apparatus when wireless connection to the first communication target apparatus and wireless connection to the second communication target apparatus are established parallelly, whether to notify the second communication target apparatus of the reconnection in accordance with a communication protocol used in the second wireless connection.

According to another aspect of the present invention, there is provided a communication method in a communication apparatus capable of parallelly establishing first wireless connection for connecting to a first communication target apparatus via an external apparatus and second wireless connection for directly connecting to a second communication target apparatus without going through the external apparatus, the method comprising: controlling, if wireless connection with the first communication target apparatus is disconnected, and reconnection is made with the first communication target apparatus when wireless connection to the first communication target apparatus and wireless connection to the second communication target apparatus are established parallelly, whether to notify the second communication target apparatus of the reconnection in accordance with a communication protocol used in the second wireless connection.

According to another aspect of the present invention, there is provided a non-transitory computer-readable medium storing a program that causes a computer capable of parallelly establishing first wireless connection for connecting to a first communication target apparatus via an external apparatus and second wireless connection for directly connecting to a second communication target apparatus without going through the external apparatus to execute a communication method comprising: controlling, if wireless connection with the first communication target apparatus is disconnected, and reconnection is made with the first communication target apparatus when wireless connection to the first communication target apparatus and wireless connection to the second communication target apparatus are established parallelly, whether to notify the second communication target apparatus of the reconnection in accordance with a communication protocol used in the second wireless connection.

According to the present invention, it is possible to implement efficient communication processing.

Further features of the present invention will become apparent from the following description of exemplary embodiments (with reference to the attached drawings).

BRIEF DESCRIPTION OF THE DRAWINGS

FIG. 10 is a sequence chart when reconnection is made by utilizing a common channel in two modes;

FIG. 12 is a basic sequence chart (with a conflict) when reconnection is made in Bonjour;

DESCRIPTION OF THE EMBODIMENTS

An embodiment of the present invention will exemplarily be described in detail below with reference to the accompanying drawings. Note that the relative arrangement of components, display screens, and the like set forth in the embodiment do not intend to limit the scope of the invention to them, unless otherwise specified.

[System Arrangement]

First, an example of a system arrangement for implementing the embodiment to be described below will be described with reference to FIGS. 1 to 6.

Figure 1:
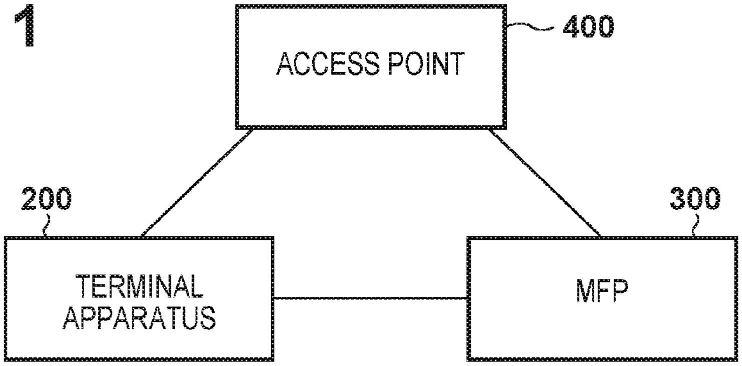
FIG. 1 is a block diagram showing an example of the arrangement of a wireless communication system.

FIG. 1 is a block diagram showing an example of the arrangement of a system including a portable communication terminal apparatus (to be simply referred to as a terminal apparatus) 200, a print apparatus (Multi Function Printer, to be referred to as an MFP hereinafter) 300, and an access point 400. FIG. 1 shows three apparatuses. However, the present invention is not limited to this, and FIG. 1 may include another apparatus. Further, each apparatus is not limited to one but may include a plurality of apparatuses. Furthermore, in this embodiment, a description will be given by taking, as an example, the print apparatus (MFP) as an apparatus capable of operating a plurality of wireless communication functions simultaneously. However, the present invention is not limited to this but may be applied to another communication apparatus.

The terminal apparatus 200 is an apparatus which includes a communication unit compatible with a wireless LAN (to be referred to as a WLAN hereinafter). For example, a personal information terminal such as a PDA (Personal Digital Assistant), a mobile phone, a digital camera, or the like can be given as the terminal apparatus 200. The print apparatus (MFP) 300 can only perform wireless communication with the terminal apparatus 200, and may additionally have a reading function (scanner), a FAX function, and a telephone function. In this embodiment, the print apparatus has been described by taking, as the example, the MFP having the reading function and a print function. However, the present invention is not limited to this, but the MFP may further have another function. The access point 400 includes a WLAN communication unit and provides communication in an infrastructure mode by relaying communication between apparatuses permitted to be connected to the access point 400.

The terminal apparatus 200 and the MFP 300 can perform wireless communication in the infrastructure mode via the access point 400 by their WLAN communication units, and can also perform communication in a P2P mode such as WFD. Note that the terminal apparatus 200 and the MFP 300 can execute processing compatible with a plurality of print services via the WLAN, as will be described later.

Figure 2:
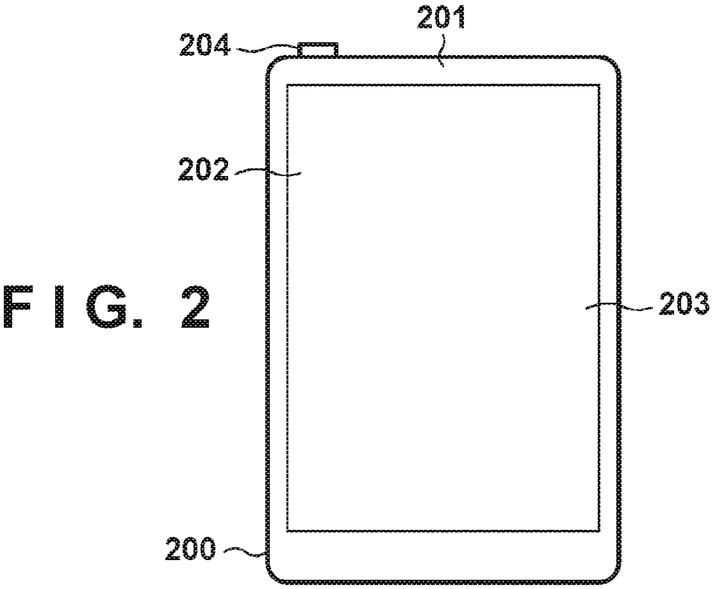
FIG. 2 is a view showing the outer appearance of a terminal apparatus according to an embodiment.

FIG. 2 is a view showing the outer appearance of the terminal apparatus 200 according to this embodiment. In this embodiment, a description will be given by taking, as an example, a smartphone as the terminal apparatus 200. The smartphone refers to a multi-function mobile phone which incorporates a camera, a web browser, an email function, and the like in addition to functions of a phone.

A WLAN unit 201 is a unit configured to perform WLAN communication. The WLAN unit 201 can perform, for example, data (packet) communication in a WLAN system complying with the IEEE802.11 series. In wireless communication using the WLAN unit 201, communication based on WFD, communication by a software AP (Access Point) mode or the infrastructure mode, or the like is available. A display unit 202 is, for example, a display having an LCD display mechanism. An operation unit 203 includes a touch-panel operation mechanism, and detects an operation by the user. A representative operation method includes a method of detecting an operation event by causing the display unit 202 to display a button icon and software keyboard, and causing the user to touch these portions. In this embodiment, the display unit 202 and the operation unit 203 have a touch-panel integrated arrangement. A power key 204 is a hard key used to power on/off the terminal apparatus 200.

Figure 3:
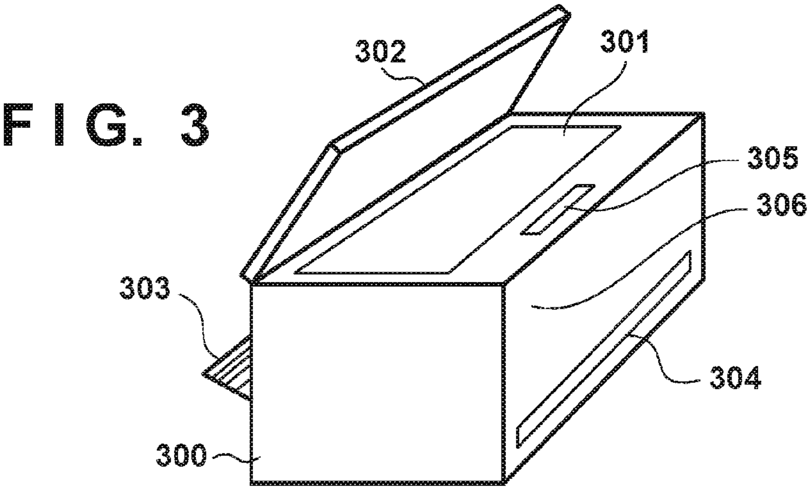
FIG. 3 is a view showing the outer appearance of an MFP according to an embodiment.

FIG. 3 is a view showing the outer appearance of the MFP 300 according to this embodiment. In FIG. 3, an original table 301 is a transparent glass table on which an original to be read by a scanner (reading unit) is placed. An original cover 302 is a part used to press an original when the scanner reads the original, and prevent external leakage of light from a light source, with which the original is irradiated at the time of reading. A printing paper insertion port 303 is an insertion port capable of setting paper sheets having a variety of sizes. Printing media such as pieces of paper set in the printing paper insertion port 303 are conveyed to a printing unit one by one. Each paper undergoes printing in the printing unit and is discharged from a printing paper discharge port 304. An operation display unit 305 is formed from, for example, keys such as character input keys, a cursor key, an enter key, a cancel key, and the like and an LED (Light Emitting Diode) or an LCD (Liquid Crystal Display). The user can start the various functions or make various settings in the MFP 300 via the operation display unit 305. The operation display unit 305 is formed by a touch panel, and may be formed by integrating the display unit and the operation unit with each other. A WLAN antenna 306 is an antenna for WLAN communication and is included inside the MFP 300.

Figure 4A:
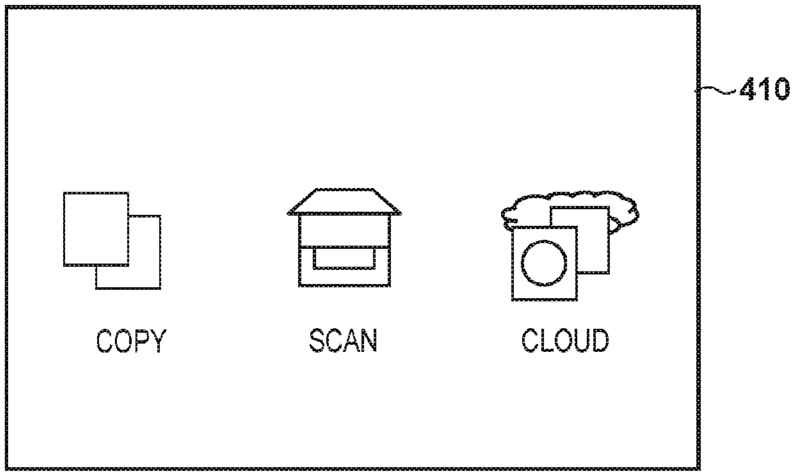
FIGS. 4A, 4B, and 4C are views each showing an example of a screen displayed in an operation unit of the MFP.
Figure 4B:
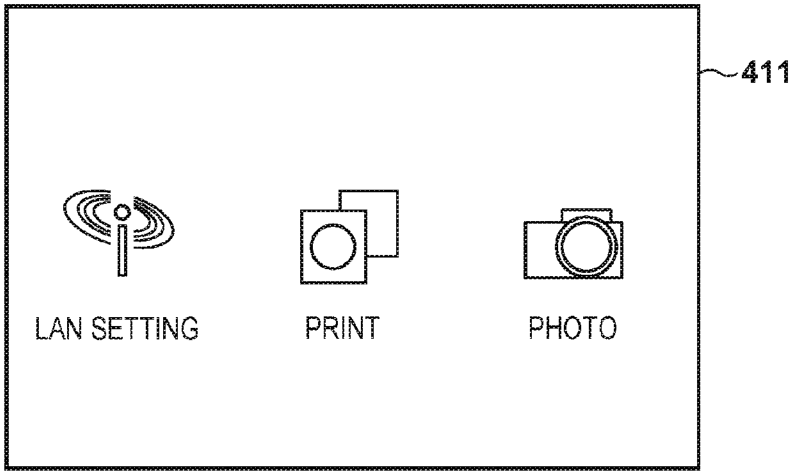
Figure 4C:
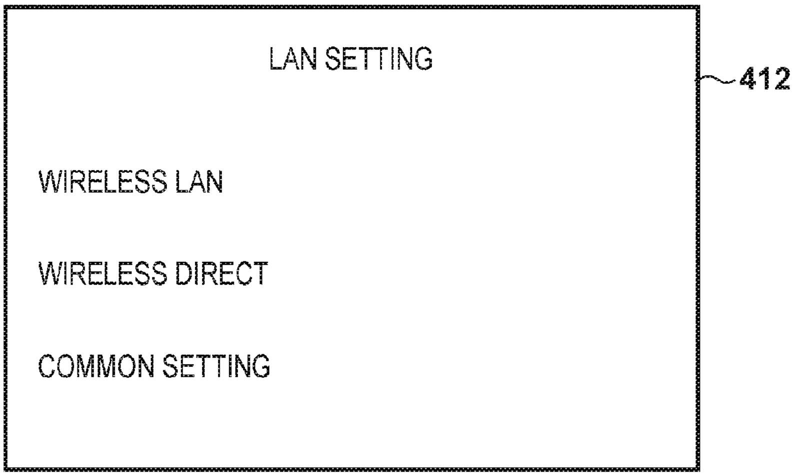

FIGS. 4A to 4C are views each schematically showing an example of a screen display in the operation display unit 305 of the MFP 300. FIG. 4A shows the example of the arrangement of a home screen 410 which displays a state (idle state) in which the MFP 300 is powered on and an operation such as print or scan is not performed. Copy, scan, menu display or various settings of a cloud function utilizing Internet communication, or function execution can be performed by a key operation or a touch panel operation on the operation display unit 305. It is also possible, by the key operation or the touch panel operation, to display a function (FIG. 4B) different from that in FIG. 4A seamlessly from the home screen 410 of FIG. 4A. FIG. 4B is the example of a screen which displays different functions by an operation, and here shows a screen 411 which selectably displays functions capable of executing execution of a print and photo functions and the change of LAN setting. FIG. 4C shows a screen 412 displayed when the LAN setting is selected on the screen 411 of FIG. 4B. The user can set activation/deactivation of the infrastructure mode by selecting the "wireless LAN" via the screen 412. The user can also set activation/deactivation of the P2P mode (Peer-to-Peer mode) by selecting "wireless direct". Note that the functions shown in FIGS. 4A to 4C are merely an example, and the present invention is not limited to these. In addition, a screen switchable by an operation is not limited to the above-described screens, and can be displayed by further being switched to another screen.

Figure 5:
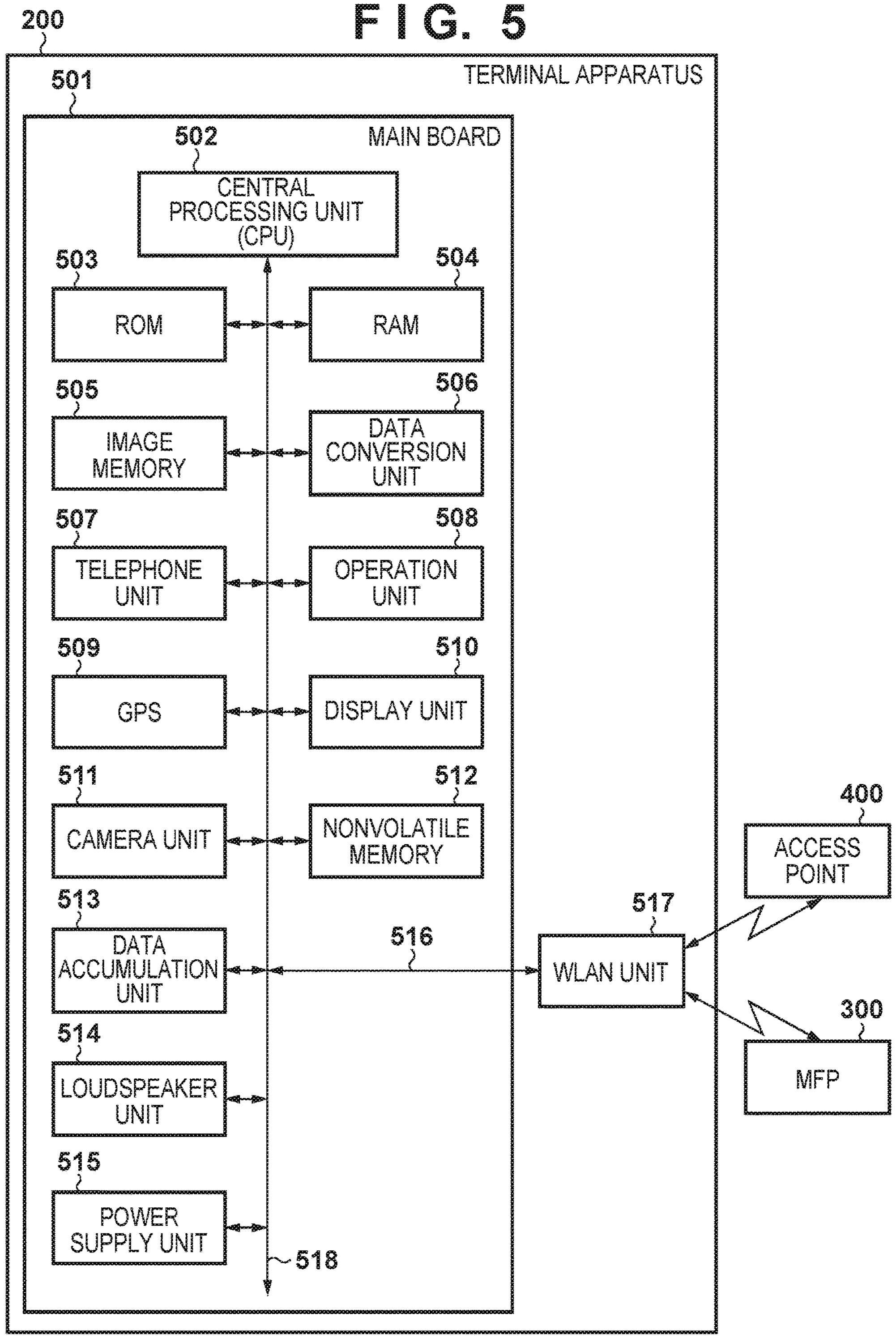
FIG. 5 is a block diagram showing an example of the hardware arrangement of the terminal apparatus.

FIG. 5 is a block diagram showing an example of the hardware arrangement of the terminal apparatus 200. The terminal apparatus 200 includes a main board 501 which performs main control of the apparatus itself and a WLAN unit 517 which performs WLAN communication.

In the main board 501, a CPU (Central Processing Unit) 502 is a system control unit and controls overall various operations of the terminal apparatus 200. The following processing by the terminal apparatus 200 is executed under the control of the CPU 502. A ROM 503 is a nonvolatile storage area, and stores control programs to be executed by the CPU 502, an embedded operating system (OS) program, and the like. In this embodiment, the respective control programs stored in the ROM 503 are executed by the CPU 502, performing software control such as scheduling and task switching under the management of the embedded OS stored in the ROM 503.

A RAM 504 is a volatile storage area and is implemented by an SRAM (Static RAM) or the like. The RAM 504 stores data such as program control variables, also stores data such as setting values registered by the user and management data of the terminal apparatus 200, and is allocated with various work buffer areas. An image memory 505 is implemented by a memory such as a DRAM (Dynamic RAM), and temporarily stores image data received via the WLAN unit 517 and those read out from a data accumulation unit 513 so as to be processed by the CPU 502. A nonvolatile memory 512 is implemented by a memory such as a flash memory, and continues to store data even after power-off. Note that a memory structure is not limited to the above-described structure. For example, the image memory 505 and the RAM 504 may share a memory, or data may be backed up in the data accumulation unit 513. In this embodiment, a DRAM is used as the image memory 505. However, another storage medium such as a hard disk or a nonvolatile memory may be used, or an external storage area may further be connected.

A data conversion unit 506 performs analysis of data of various formats, and data conversion such as color conversion and image conversion. A telephone unit 507 controls a telephone line, and implements telephone communication by processing audio data input/output via a loudspeaker unit 514. An operation unit 508 controls signals of the operation unit 203 shown in FIG. 2. A GPS (Global Positioning System) 509 externally obtains position information such as the current latitude and longitude of the terminal apparatus 200. A display unit 510 electronically controls the display contents of the display unit 202 shown in FIG. 2, allows various input operations, and can display operation states, status conditions, and the like of the terminal apparatus 200.

A camera unit 511 has a function of electronically recording and encoding an image input via a lens (not shown). An image captured by the camera unit 511 is saved in the data accumulation unit 513. The loudspeaker unit 514 implements a function of inputting or outputting a speech for the telephone function, and also an alarm notification function and the like. A power supply unit 515 is implemented by a portable battery, and controls power supply to the apparatus. A power supply state includes a battery dead state in which the battery has no remaining amount, a power-off state in which the power key 204 is not pressed, a start state in which the apparatus is normally started, a power saving state in which the apparatus is started but set in a power saving mode, and the like.

The terminal apparatus 200 can perform wireless communication with an external apparatus via the WLAN by the WLAN unit 517 serving as a communication unit. Thus, the terminal apparatus 200 performs data communication with another device such as the MFP 300 or the access point 400. The WLAN unit 517 converts data into packets, and sends the packets to the other device. Conversely, the WLAN unit 517 converts packets coming from another external device into original data, and sends the data to the CPU 502. The WLAN unit 517 is connected to the main board 501 via a bus cable 516. The WLAN unit 517 is a unit used to attain communication complying with its standard.

The respective components (503 to 515 and 517) of the main board 501 are connected to each other via a system bus 518 and are arranged to be able to communicate with each other. Note that the data conversion unit 506 or the like may be configured to implement a function by the programs executed by the CPU 502 as needed.

Figure 6:
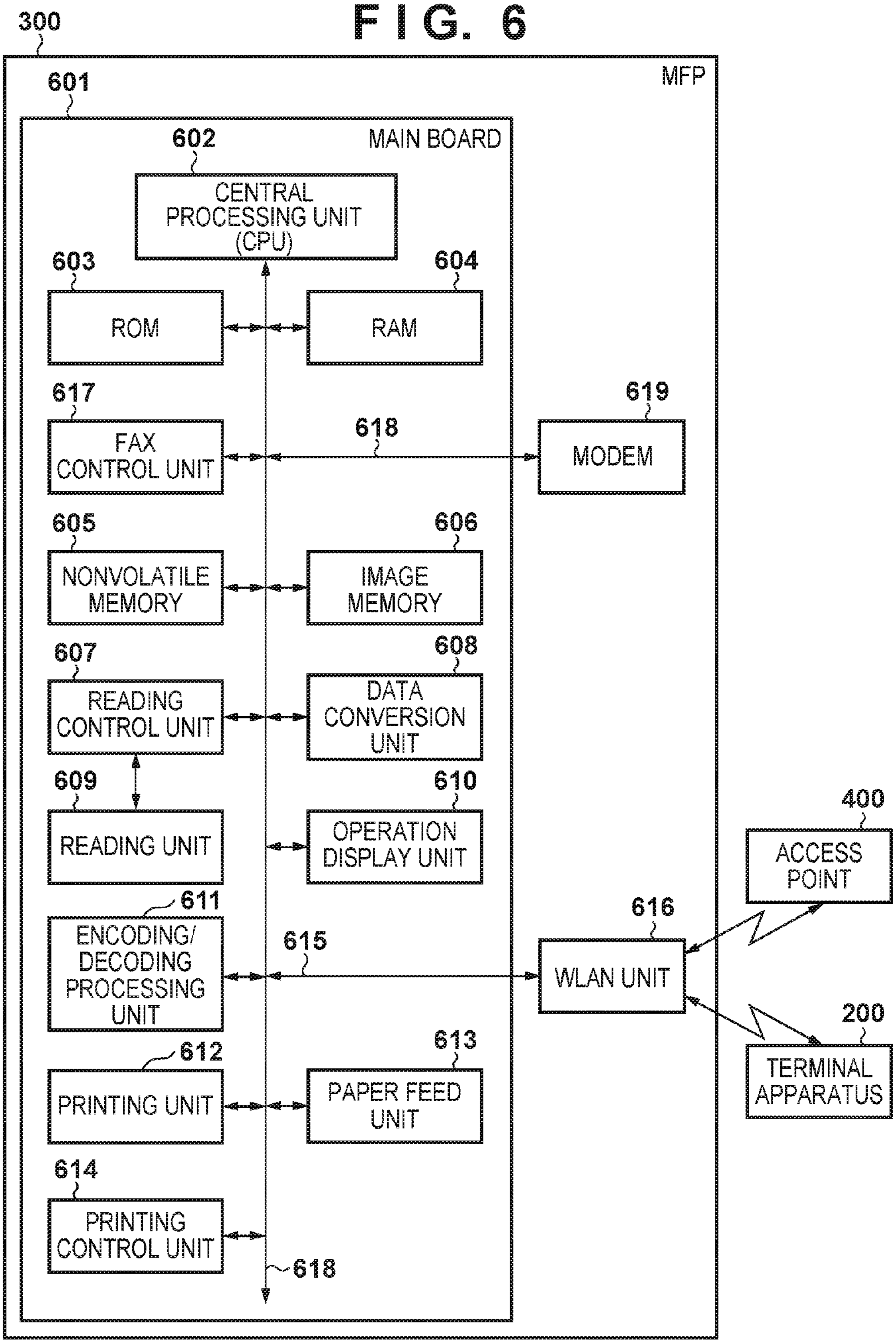
FIG. 6 is a block diagram showing an example of the hardware arrangement of the MFP.

FIG. 6 is a block diagram showing the hardware arrangement of the MFP 300. The MFP 300 includes a main board 601 which performs main control of the apparatus itself, a WLAN unit 616 which performs WLAN communication, and a modem 619.

In the main board 601, a CPU (Central Processing Unit) 602 is a system control unit, and controls the overall various operations of the MFP 300. The following processing by the MFP 300 is executed under the control of the CPU 602. A ROM 603 is a nonvolatile storage area, and stores control programs to be executed by the CPU 602, an embedded operating system (OS) program, and the like. In this embodiment, the respective control programs stored in the ROM 603 are executed by the CPU 602, performing software control such as scheduling and task switching under the management of the embedded OS stored in the ROM 603.

A RAM 604 is a volatile storage area and is implemented by an SRAM (Static RAM) or the like. The RAM 604 stores data such as program control variables, also stores data such as setting values registered by the user and management data of the MFP 300, and is allocated with various work buffer areas. A nonvolatile memory 605 is implemented by a memory such as a flash memory, and continues to store data even after power-off. An image memory 606 is implemented by a memory such as a DRAM (Dynamic RAM), and accumulates image data received via the WLAN unit 616, those processed by an encoding/decoding processing unit 611, and the like. Note that a memory structure is not limited to the above-described structure, similarly to the memory structure of the terminal apparatus 200.

A data conversion unit 608 performs analysis of data of various formats, conversion from image data into print data, and the like. A reading control unit 607 controls a reading unit 609 (for example, a CIS image sensor (contact type image sensor)) to optically read an image on an original. Next, the reading control unit 607 outputs an image signal obtained by converting the read image into electrical image data. At this time, various kinds of image processing such as binarization processing and halftone processing may be performed for the image signal, thereby outputting the resultant data.

An operation display unit 610 corresponds to the operation display unit 305 shown in FIG. 3. The encoding/decoding processing unit 611 performs encoding/decoding processing and enlargement/reduction processing for image data (JPEG, PNG, or the like) handled by the MFP 300. A paper feed unit 613 holds paper sheets used in printing. The MFP 300 can feed the paper sheet from the paper feed unit 613 under the control of a printing control unit 614. Further, as the paper feed unit 613, a plurality of paper feed units can be prepared so as to hold a plurality of types of paper sheets in one apparatus. In this case, the printing control unit 614 controls to select a paper feed unit to be used to supply paper sheets.

The printing control unit 614 performs various kinds of image processing such as smoothing processing, printing density correction processing, and color correction for image data to be printed, and outputs the processed image data to a printing unit 612. The printing unit 612 can adopt, for example, an inkjet method of printing an image by discharging, from a printhead, ink supplied from an ink tank. The printing control unit 614 also plays a role in periodically reading out information of the printing unit 612, and updating information in the RAM 604. More specifically, the printing control unit 614 updates status information such as the remaining amount of an ink tank and a printhead state.

The MFP 300 also incorporates the WLAN unit 616, similarly to the terminal apparatus 200, and a description thereof will be omitted since their functions are the same. The WLAN unit 616 is connected to the main board 601 via a bus cable 615. Note that the terminal apparatus 200 and the MFP 300 can perform communication based on WFD (Wi-Fi Direct®), and has a software access point (software AP) function. A modem 619 performs conversion between a digital signal and an analog signal, and is used to communicate with an external device by using the telephone line.

The respective components (602 to 614, 616 and 617, and 619) of the main board 601 are connected to each other via a system bus 618 managed by the CPU 602, and are arranged to be able to communicate with each other. Note that the data conversion unit 608, the encoding/decoding processing unit 611, or the like may be configured to implement a function by the programs executed by the CPU 602 as needed.

The MFP 300 of this embodiment includes the first communication protocol module that needs to take a measure against a conflict of at least service names or host names and the second communication protocol module that does not need an anti-conflict measure. As an example, the first communication protocol module corresponds to a Bonjour protocol, and the second communication protocol module corresponds to a WSD protocol. One communication protocol module is shared by connection in the infrastructure mode and connection in the P2P mode. Each of the first and second communication protocol modules includes one socket capable of receiving commands from both the connection in the infrastructure mode and the connection in the P2P mode. Note that in this embodiment, one communication protocol module basically executes the same processing for both connections in order to simplify processing.

[P2P (Peer-to-Peer) Mode]

A plurality of modes are given as a method of implementing P2P in communication by WLAN. In each mode, a search device searches for a device (to be referred to as a communication target apparatus or a counter device) to be a communication target by using the same device search request (for example, a Probe Request frame). It is possible to send a device search request added with various attributes (parameters). It is recommended that when attributes are designated in the device search request, the device responds to interpretable attributes as much as possible within a range defined by the specifications of the mode and assumed specifications (Wi-Fi® for WFD) as a response to the device search request. Even if information (including the above attributes) added to the device search request contains uninterpretable information, it is possible to respond to the received device search request based on only interpretable information.

As modes in the P2P mode, the following two modes are plausible.

mode A (software AP mode)

mode B (Wi-Fi Direct (WFD) mode)

For the respective modes, compatible devices may be different, and usable applications may also be different.

Wireless connection sequences in the respective modes will be described below with reference to FIGS. 7 and 8. Note that in a device having a communication function by WFD, an application specializing in implementing its communication function is called from its operation unit. Then, a negotiation for performing WFD communication is executed based on an operation for a UI (user interface) serving as an operation screen provided by the application.

Figure 7:
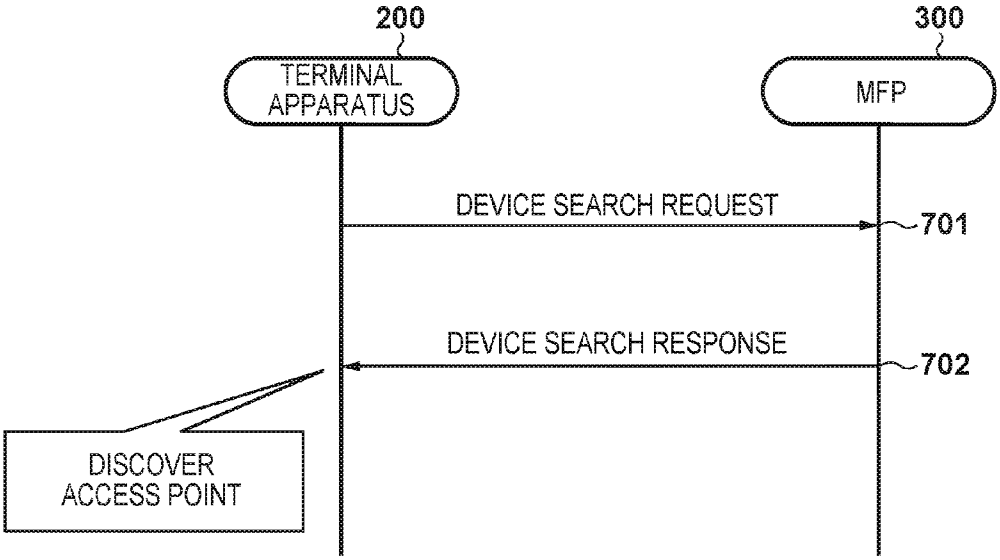
FIG. 7 is a sequence chart showing a wireless connection sequence in mode A (software AP mode)

FIG. 7 is a sequence chart showing a wireless connection sequence in mode A (software AP mode). In the software AP mode, among devices (for example, the terminal apparatus 200 and the MFP 300) which communicate with each other, one (for example, the terminal apparatus 200) serves as a client which plays a role in requesting various services, and the other (for example, the MFP 300) serves as a software AP which implements the function of an access point in WLAN by software settings.

In the software AP mode, the client searches for a device to serve as a software AP by using a device search request (701). When the software AP is detected by a device search response (702), the remaining wireless connection processing (establishment of wireless connection and the like) is performed between the client and the software AP, and then IP connection processing (assignment of IP addresses and the like) is performed. Note that commands and parameters defined by the Wi-Fi® standard can be used as those sent/received to implement wireless connection between the client and the software AP, and they are not particularly limited. Thus, a description thereof will be omitted here.

Figure 8:
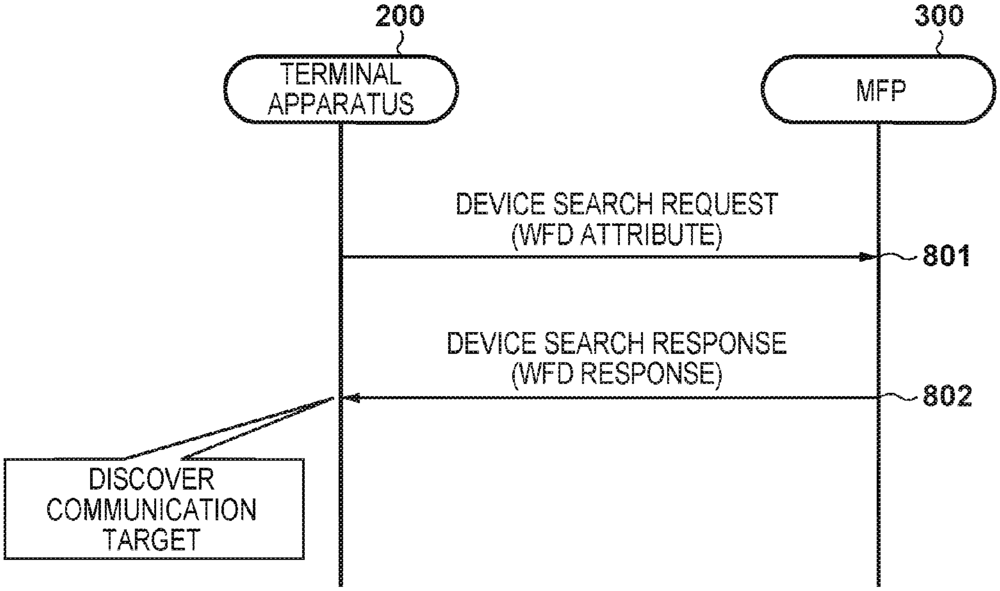
FIG. 8 is a sequence chart showing a wireless connection sequence in mode B (WFD mode)

FIG. 8 is a sequence chart showing a wireless connection sequence in mode B (WFD mode). In the WFD mode, after a device to be a communication target is detected by a device search request, roles (a group owner and a P2P client) in the P2P mode are decided, and the remaining wireless connection processing is performed. That is, the roles of the respective apparatuses are not decided at a point in time of detecting the device. The role decision processing corresponds to, for example, GO Negotiation in the P2P mode.

More specifically, first, between the devices that perform communication, one device (for example, the terminal apparatus 200) issues a device search request (801) and searches for the device connected in the WFD mode. When the other device (for example, the MFP 300) to be a communication target is detected by a device search response (WFD response) (802), both devices confirm information regarding services and functions that can be supplied to each other (device supply information confirmation). Note that this device supply information confirmation is not essential but optional. This device supply information confirmation phase corresponds to, for example, Provision Discovery in the P2P mode.

Then, the respective devices mutually confirm device supply information, deciding which one of them serves as a client or a group owner as its role (executing a negotiation process). After the client and the group owner are decided as the roles of the respective devices, parameters for performing communication by the WFD mode are exchanged (parameter exchange phase) between both devices. The client and group owner in the P2P mode perform the remaining wireless connection processing and IP connection processing based on the exchanged parameters. The parameter exchange phase corresponds to, for example, automatically exchanging parameters for wireless LAN security using Wi-Fi Protected Setup. Note that an apparatus operating as the group owner in the Wi-Fi Direct mode operates like the AP, and the client operates like a station (STA) connected to the AP. In general, the apparatus operating as the group owner sends a device search response command in response to a device search request command sent from the apparatus operating as the client. Further, the apparatus operating as the group owner compares client channel information obtained by Group Owner Negotiation with its usable channels, deciding a channel to be used in the Wi-Fi Direct mode.

[Infrastructure Mode]

Figure 9:
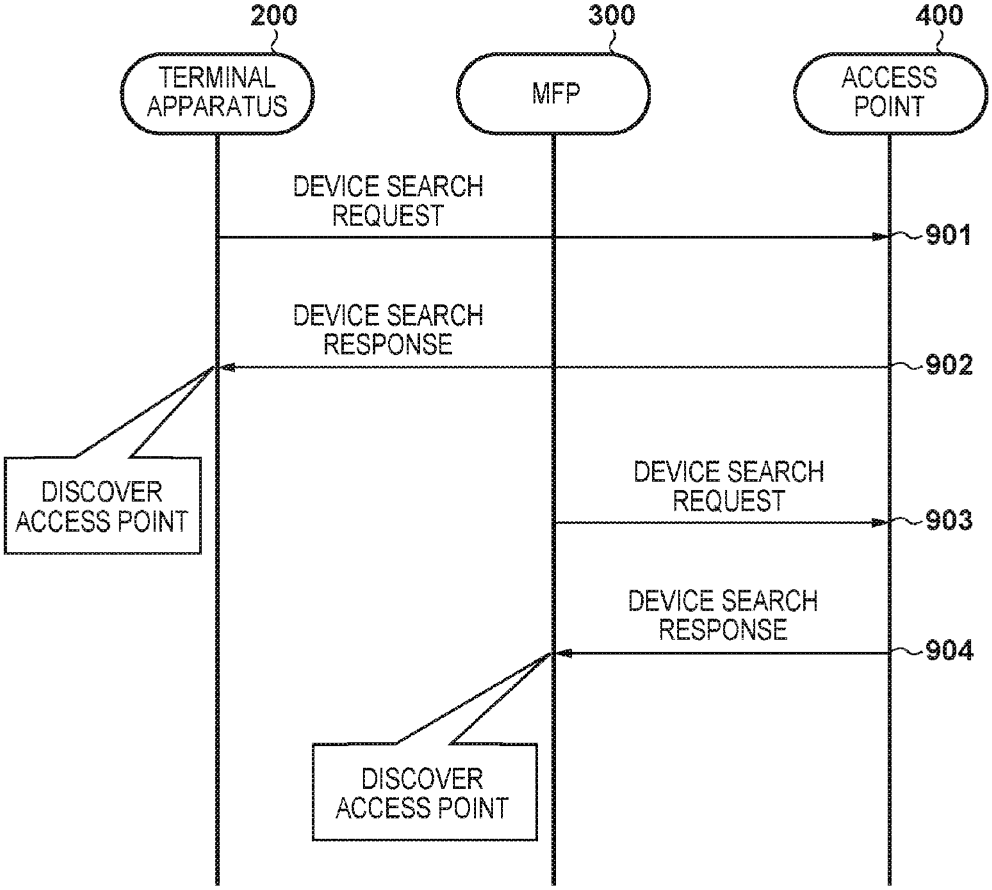
FIG. 9 is a sequence chart showing a wireless connection sequence in mode C (infrastructure mode)

FIG. 9 is a chart showing a wireless connection sequence in mode C (infrastructure mode). The infrastructure mode is a mode in which the devices (for example, the terminal apparatus 200 and the MFP 300) performing communication are connected to an "access point" (for example, the access point 400) systematically controlled in a network, and the devices communicate with each other via the access point 400. That is, the access point 400 relays communication between the devices.

In the infrastructure mode, the respective devices search for the access point 400 by device search requests (901 and 903). When the access point 400 is detected by device search responses from the access point (902 and 904), the remaining wireless connection processing (establishment of wireless connection and the like) is performed between the respective devices and the access point 400, and then IP connection processing (assignment of IP addresses and the like) is performed.

Note that commands (packets) and parameters defined by the Wi-Fi® standard can be used as those sent/received to implement wireless connection between the devices and the access point 400, and they are not particularly limited. Thus, a description thereof will be omitted here.

[Channel Decision Sequence in Infrastructure Mode and P2P Mode]

The MFP 300 can parallelly establish connection (infrastructure connection) with a communication target apparatus via an external apparatus (such as an access point) and direct connection (P2P connection) with the communication target apparatus without going through the external apparatus. An operation of establishing infrastructure connection and P2P connection parallelly as described above will be referred to as a "simultaneous operation" hereinafter. As an example of P2P connection, there is a Wi-Fi Direct mode. Note that in a mode in which communication is performed by assigning a plurality of channels to one wireless IC chip simultaneously, the arrangement of each apparatus which performs communication and processing executed by each apparatus becomes complicated. Therefore, when the MFP 300 performs the simultaneous operation, it is desirable to use a common channel in communication in each mode. That is, it is also desirable to use only one channel when the MFP 300 performs the simultaneous operation. Therefore, in this embodiment, the WLAN unit 616 includes only one wireless IC chip which implements communication by a predetermined channel, and the MFP 300 does not perform communication by using the plurality of channels simultaneously.

Wireless connection in the infrastructure mode is performed using a specific frequency band (wireless channel). To decide a channel to be used, first, with respect to channels usable by the client, the client sequentially confirms, with the access point, whether wireless connection is possible in the infrastructure mode. The client then specifies a channel for which the access point has responded, and decides the specified channel as a channel to be used subsequently. That is, only if the client sends a request using a channel usable by the access point, the access point sends a response to the client.

In a wireless communication system including an access point and a client, an apparatus serving as an access point first transmits a beacon (Beacon) signal. Upon receiving the beacon signal, the client sends a probe request command (Probe Request frame) to the access point.

The access point sends no response to a device search request sent from the client using a channel except for its usable channel. If, for example, the channel usable by the access point is the nth channel, the access point sends no response to a device search request sent from the client using a first channel. After sending the device search request using the first channel, if the client determines, due to a time-out or the like, that the access point sends no response, it then sends a device search request using a second channel. The client repeats the above attempt while incrementing the channel number and sends a device search request using the nth channel. Then, the access point sends a device search response since the nth channel is usable when receiving the device search request using the channel. Note that the device search response corresponds to a probe response command. In subsequent wireless communication in the infrastructure mode, the nth channel to which the access point returns the device search response is used.

Wireless connection in the P2P mode is also performed using a specific frequency band (wireless channel). In order to stably maintain wireless communications in two modes, a channel for which the access point has responded in the infrastructure mode is obtained, and the channel is set as a common channel of Group Owner in the P2P mode.

In each of the infrastructure mode and the P2P mode, a channel defined by a standard of Wi-Fi® is utilized. In the standard of Wi-Fi®, 1 to 13 channels can be utilized as channels in a 2.4-GHz frequency band in some countries or regions. In this embodiment, a range of all the utilized channels will be described as 1 to 13 channels. However, the present invention is not limited to 1 to 13 channels because the number of channels increases in a different frequency band, or some countries or regions regulate channels to 1 to 11 channels even in the same frequency band due to regulations on a frequency band. For example, it is known that a range of about 36 to 140 channels is utilized because a 5-GHz frequency band is used in 802.11a of a wireless LAN standard. When the client uses the frequency bands of 2.4

GHz (1 to 13) and 5 GHz (36 to 140), the number of channels that should send a probe request command to the access point increases.

FIG. 10 is a sequence chart for explaining processing of the MFP 300 serving as a communication apparatus which parallelly performs (that is, performs the simultaneous operation) wireless communications in the infrastructure mode and the P2P mode. FIG. 10 particularly shows a sequence in which reconnection is made by utilizing a common channel when communication between the MFP 300 and the access point 400 that perform the simultaneous operation is disconnected. Note that the terminal apparatus 200 and the MFP 300 are connected in the P2P mode. Also, the MFP 300 and the access point 400 are connected in the infrastructure mode. Note that if performance of the simultaneous operation is activated, the MFP 300 is controlled to operate as a group owner in the P2P mode (Wi-Fi Direct mode). That is, in the processing of FIG. 10, wireless connection between the MFP 300 and the terminal apparatus 200 is established in the Wi-Fi direct mode without performing the above-described negotiation process. With communication 1001, the MFP 300 establishes wireless connection with the access point 400 using CH-n (nth channel) decided by the access point 400. Subsequently, the MFP 300 issues a beacon signal indicating that it is the group owner. Note that this beacon signal may include using CH-n for P2P connection. The terminal apparatus 200 receiving this beacon signal sends a device search request to the MFP 300 using CH-n. Then, the MFP 300 makes a device search response and establishes P2P connection (1002). Therefore, at a point in time of a state 1003 between processing 1002 and processing 1004, the MFP 300 is parallelly establishing (performing the simultaneous operation) in the infrastructure mode and the P2P mode.

In 1004, wireless connection between the MFP 300 and the access point 400 is disconnected. As a cause of disconnection here, a poor radio wave state, the end of an application, sending of a disconnection packet by changing a device setting, or the like is given as an example.

After communication between the MFP 300 and the access point 400 is disconnected (1004), as communication 1005, the MFP 300 sends a device search request to the access point 400 by using the nth channel used in P2P connection with the terminal apparatus. The reason why the MFP 300 sends the device search request by using CH-n preferentially in the communication 1005 will be described here. For example, if the MFP 300 executes an AP search (communication 1005) by a channel other than the channel used for the infrastructure connection (CH-n currently being used for P2P connection), communication by the P2P mode needs to be stopped temporarily. In this case, a packet loss may occur in communication by the P2P mode. The packet loss indicates that a packet sent by the terminal apparatus 200 using the channel (CH-n in the above-described example) used for P2P connection is not received by the MFP 300 and lost because the MFP 300 uses the channel other than the channel used for P2P connection. In order to avoid such a packet loss, the MFP 300 executes the AP search using CH-n preferentially in the communication 1005.

The MFP 300 sends the device search request using the nth channel, and then the access point 400 sends a device search response as communication 1006. In communication from communication 1007, wireless connection is performed using the nth channel. As a result, before disconnection, the MFP 300 can return to a state in which it operates as a client for the access point 400 and as a Group Owner for the terminal apparatus 200 to commonly use the nth channel. Note that as shown in FIG. 10, the device search request may be sent a predetermined number of times using the nth channel until connection is recovered after disconnection. The MFP 300 holds, in a storage unit or the like, information on the channel (here, information on the nth channel) which performs connection in the communication 1001. Also in this case, the device search request is sent using CH-n, making it possible to avoid the above-described packet loss.

However, when the channel of the access point 400 changes after disconnection, if a self apparatus continues to use the channel (CH-n) provided from the access point 400 in the communication 1001 in the past, then it becomes impossible to reconnect to the access point 400. Thus, if it is impossible to discover the access point 400 even by performing the AP search using CH-n in the communication 1005, a search is made by all channels other than the channel (here, other than the nth channel) provided from the access point 400. Note that the access point 400 may be able to set whether to change a channel provided by the access point 400 after disconnection.

[Basic Sequence]

Service announce processing depending on a protocol on a P2P-mode side when an infrastructure-mode side is reconnected while the simultaneous operation is performed in the infrastructure mode and the P2P mode will be described. A description will be given here by taking, as examples, a Bonjour protocol and a WSD (Windows Service Discovery) protocol as protocols used in the infrastructure mode and the P2P mode. As described above, the Bonjour protocol needs to take a measure against a conflict of service names or host names to be announced. On the other hand, the WSD protocol does not need an anti-conflict measure. The conflict indicates that the overlap of setting values (service names or host names) used in wireless connection occurs.

Note that the communication target apparatus connected to the access point 400 actually executes processing on an access point side in FIGS. 11 to 14 to be described later.

Each process shown in a sequence to be described below is implemented when, for example, a processing unit (a CPU or the like) of each apparatus reads out and executes various programs.

(Case of Bonjour Protocol)

Figure 11:
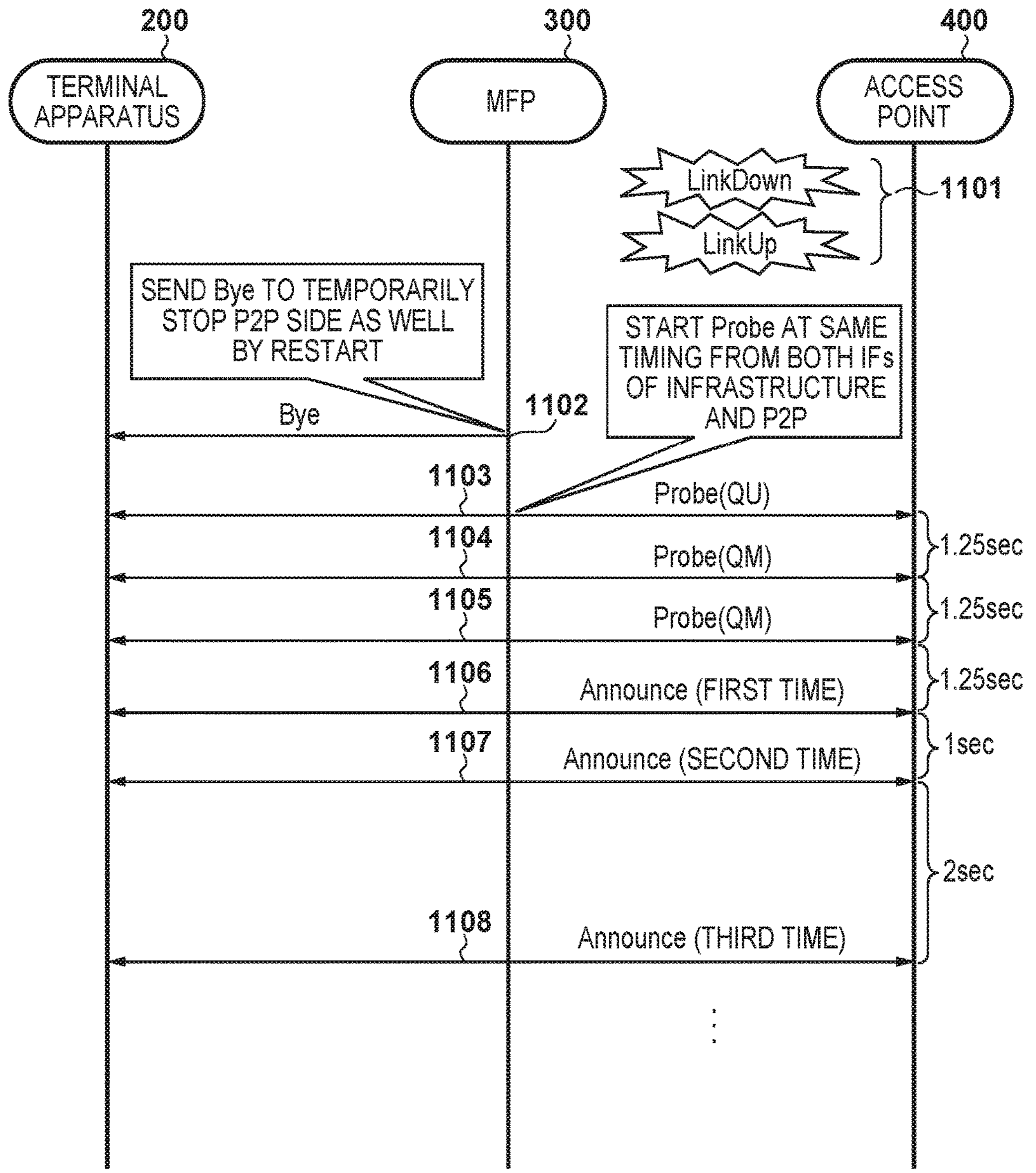
FIG. 11 is a basic sequence chart (without any conflict) when reconnection is made in Bonjour.

FIG. 11 shows a basic sequence in which reconnection is made when a protocol on the P2P-mode side is the Bonjour protocol, and shows a case in which no conflict occurs. The MFP 300 establishes wireless connection with the access point 400 in the infrastructure mode and establishes wireless connection with the terminal apparatus 200 in the P2P mode (that is, the MFP 300 is performing the simultaneous operation). In this state, when Link Down occurs, and Link Up occurs again in wireless connection between the MFP 300 and the access point 400 in the infrastructure mode (1101), the MFP 300 starts reconnection processing.

The MFP 300 also sends a Bye command for a temporary stop on a P2P side (that is, the terminal apparatus 200) (communication 1102) in order to execute a processing process again for reconnection. After that, Probe (Query Unicast) commands are sent to both the P2P side and infrastructure side in accordance with the Bonjour protocol (communication 1103). Then, the MFP 300 sends Probe (Query Multicast) commands to both the P2P side and infrastructure side at an interval of 1.25 sec (communication 1104). The MFP 300 further sends the Probe (Query Multicast) commands to both the P2P side and infrastructure side at the interval of 1.25 sec (communication 1105).

Subsequently, the MFP 300 judges that there is no conflict of service announcements if waiting for 1.25 sec and getting no response to Probe, and sends the first Announce commands to both the P2P side and infrastructure side (communication 1106). Then, the MFP 300 sends the second Announce commands to both the P2P side and infrastructure side at an interval of one sec (communication 1107). Then, the MFP 300 sends the third Announce commands to both the P2P side and infrastructure side at an interval of two sec (communication 1108). Subsequently, the basic sequence ends. Note that time intervals of the intervals and a sending count described above are merely examples, and the present invention is not limited to the above.

The above process is common in the presence/absence of a change in IP address at the time of reconnection (1101).

FIG. 12 shows a basic sequence in which reconnection is made when the protocol on the P2P-mode side is the Bonjour protocol, and shows a case in which the conflict occurs. Note that the MFP 300 establishes wireless connection with the access point 400 in the infrastructure mode and establishes wireless connection with the terminal apparatus 200 in the P2P mode (that is, the MFP 300 is performing the simultaneous operation). In this state, when Link Down occurs, and Link Up occurs again in wireless connection between the MFP 300 and the access point 400 in the infrastructure mode (1201), the MFP 300 starts reconnection processing.

The MFP 300 also sends a Bye command for a temporary stop on the P2P side (that is, the terminal apparatus 200) (communication 1202) in order to execute a processing process again for reconnection. After that, Probe (Query Unicast) commands are sent to both the P2P side and infrastructure side in accordance with the Bonjour protocol (communication 1203). An Answer packet is sent from the infrastructure side to the communication 1203 via the access point 400 (communication 1204). The MFP 300 that has received the Answer packet judges that the conflict occurs (1205). In this case, the MFP 300 changes a service name or the like, and sends Probe (Query Unicast) commands to both the P2P side and infrastructure side again (communication 1206). Consequently, the conflict is resolved. Then, the MFP 300 sends Prove (Query Multicast) commands to both the P2P side and infrastructure side at the interval of 1.25 sec (communication 1207). The MFP 300 further sends the Probe (Query Multicast) commands to both the P2P side and infrastructure side at the interval of 1.25 sec (communication 1208).

Subsequently, the MFP 300 judges that there is no conflict of service announcements if waiting for 1.25 sec and getting no response to the Probe commands, and sends the first Announce commands to both the P2P side and infrastructure side (communication 1209). Then, the MFP 300 sends the second Announce commands to both the P2P side and infrastructure side at the interval of one sec (communication 1210). Then, the MFP 300 sends the third Announce commands to both the P2P side and infrastructure side at the interval of two sec (communication 1211). Subsequently, the basic sequence ends. Note that as in FIG. 11, time intervals of the intervals and a sending count described above are merely examples, and the present invention is not limited to the above.

The above process is common in the presence/absence of the change in IP address at the time of reconnection (1201). In an example of FIG. 12, the description has been given by taking a case in which the conflict occurs on the infrastructure side as an example. However, there is also a case in which the conflict occurs on the P2P side. Accordingly, the MFP 300 also sends the Bye command for the temporary stop to the P2P side (that is, the terminal apparatus 200), and sends the Probe commands to both the P2P side and infrastructure side, executing the anti-conflict measure.

(Case of WSD Protocol)

Figure 13:
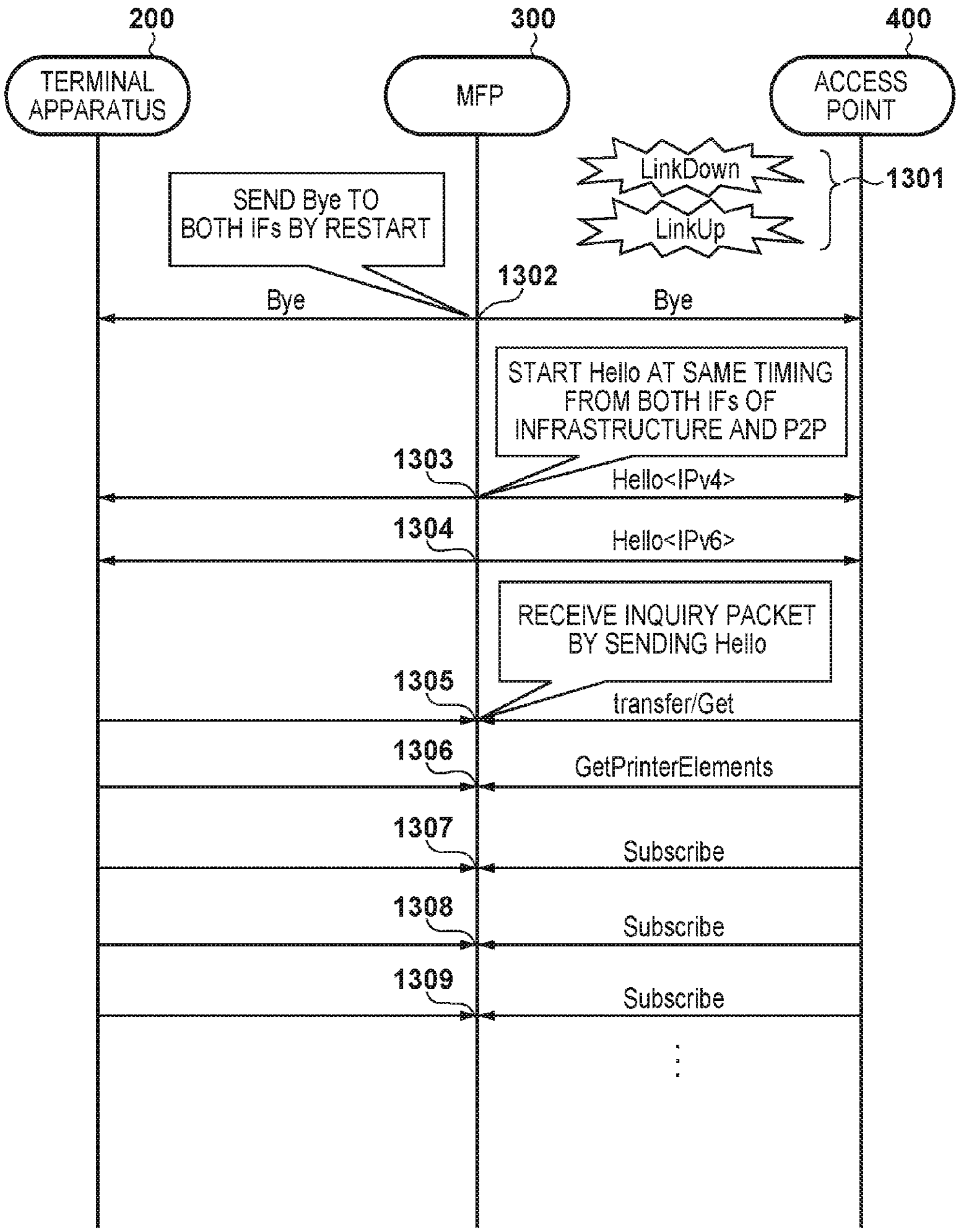
FIG. 13 is a basic sequence chart (with a change in IP address) when reconnection is made in WSD.

FIG. 13 shows a basic sequence in which reconnection is made when the protocol on the P2P-mode side is the WSD protocol, and shows a case when the change in IP address occurs. Note that in the present application, the change in IP address may be referred to as a change in communication setting. The MFP 300 establishes wireless connection with the access point 400 in the infrastructure mode and establishes wireless connection with the terminal apparatus 200 in the P2P mode (that is, the MFP 300 is performing the simultaneous operation). In this state, when Link Down occurs, and Link Up occurs again in wireless connection between the MFP 300 and the access point 400 in the infrastructure mode (event 1301), the MFP 300 starts reconnection processing.

The MFP 300 sends a Bye command for a temporary stop to both the P2P side and infrastructure side (communication 1302) in order to execute a processing process again for reconnection. Note that in this embodiment, the MFP 300 sends the Bye commands to both the P2P side and infrastructure side if the IP address assigned to the MFP 300 is changed at the time of reconnection with the access point 400. Note that the reason why the MFP 300 also sends the Bye command to the P2P side is to make a notification of a new IP address assigned to the MFP 300. On the other hand, if the IP address assigned to the MFP 300 at the time of reconnection with the access point 400 is not changed, the MFP 300 sends the Bye command only to the access point side as will be described later in FIG. 14. A switching process of sending the Bye command may be performed by another method. For example, if the IP address assigned to the MFP 300 at the time of reconnection with the access point 400 overlaps the IP address used on the P2P side, the MFP 300 sends the Bye commands to both the P2P side and infrastructure side. On the other hand, if the IP address assigned to the MFP 300 at the time of reconnection with the access point 400 does not overlap the IP address used on the P2P side, the MFP 300 may not send the Bye command to the P2P side.

After that, the MFP 300 creates IP address change information in accordance with the WSD protocol, and sends Hello<IPv4> and Hello<IPv6> commands to both the P2P side and infrastructure side (communications 1303 and 1304). The IP address change information indicates a changed IP address. IP addresses corresponding to respective versions are sent here to be compatible with both IPv4 and IPv6. Subsequently, both sides of the access point 400 and the terminal apparatus 200 which are devices receiving the Hello (communications 1303 and 1304) commands send an inquiry packet of a Transfer/Get command to the MFP 300 (communication 1305). Then, both the P2P side and infrastructure side send a GetPrinterElements command (communication 1306) and Subscribe commands (communications 1307, 1308, and 1309) sequentially. The MFP 300 performs processing on these commands and responds to them. Subsequently, the basic sequence ends.

Figure 14:
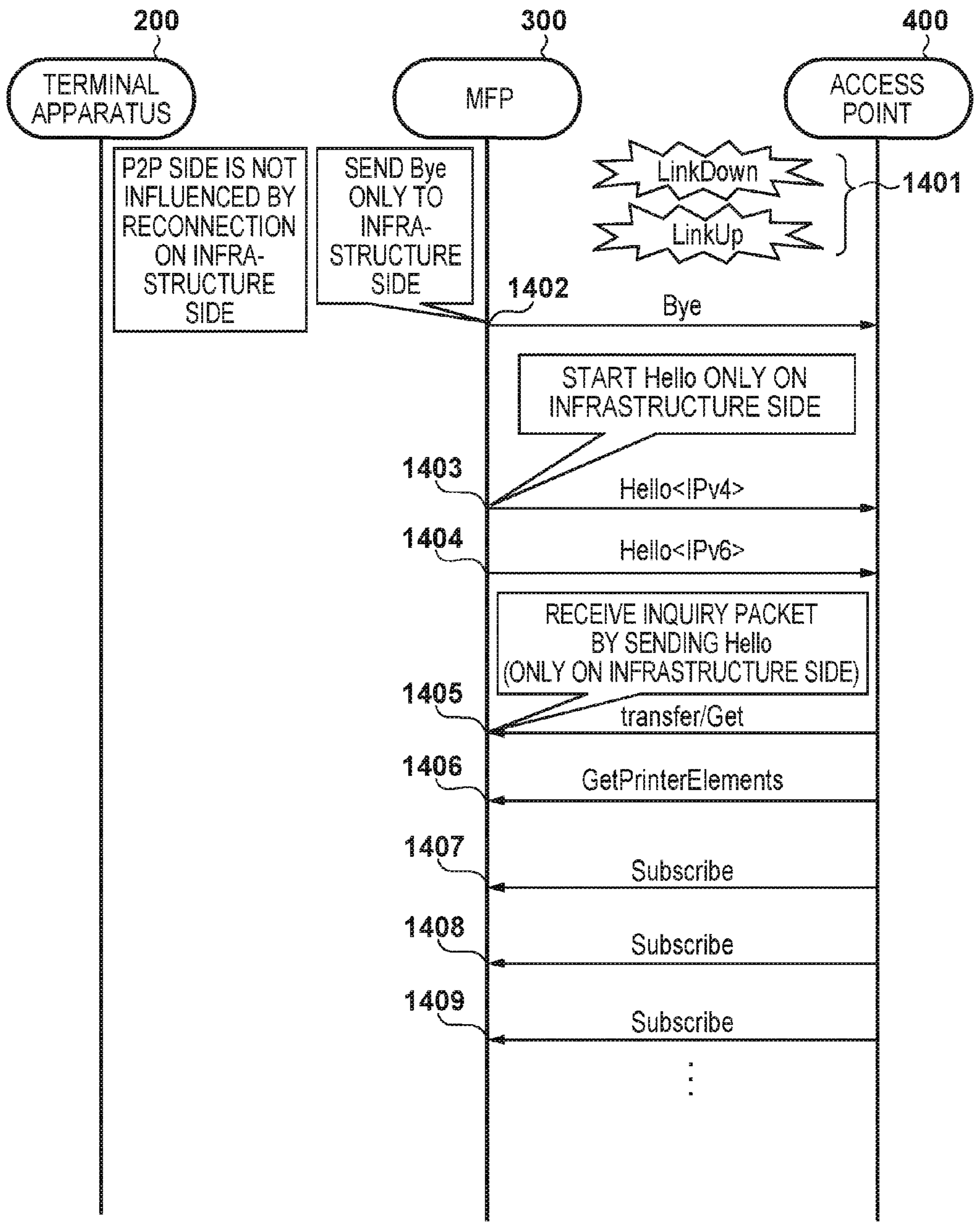
FIG. 14 is a basic sequence chart (without any change in IP address) when reconnection is made in WSD.

FIG. 14 shows a basic sequence in which reconnection is made when the protocol on the P2P-mode side is the WSD protocol, and shows a case when the change in IP address does not occur. The MFP 300 establishes wireless connection with the access point 400 in the infrastructure mode and establishes wireless connection with the terminal apparatus 200 in the P2P mode (that is, the MFP 300 is performing the simultaneous operation). In this state, when Link Down occurs, and Link Up occurs again in wireless connection between the MFP 300 and the access point 400 in the infrastructure mode (event 1401), the MFP 300 starts reconnection processing.

The MFP 300 executes the processing process again for reconnection. In this case, however, the change in IP address does not occur, and thus the MFP 300 sends a Bye command for a temporary stop only to the infrastructure side (communication 1402). That is, in this case, the P2P side is not influenced by the change in IP address, and thus wireless connection at that point in time is continued regardless of before/after the event 1401. After that, the MFP 300 sends Hello<IPv4> and Hello<IPv6> commands only to the infrastructure side in accordance with the WSD protocol (communications 1403 and 1404). Subsequently, only the infrastructure side which is a device receiving the Hello (communications 1403 and 1404) commands sends an inquiry packet of a Transfer/Get command to the MFP 300 (communication 1405). Then, the infrastructure side sends a GetPrinterElements command (communication 1406) and Subscribe commands (communications 1407, 1408, and 1409) sequentially. The MFP 300 performs processing on these commands and responds to them. Subsequently, the basic sequence ends.

As described above, FIG. 14 shows a case in which the P2P side does not receive any influence if reconnection on the infrastructure side occurs during simultaneous connection (during the simultaneous operation) to both the infrastructure and P2P. In the examples using FIGS. 13 and 14, the different sequences have been described in accordance with the presence/absence of the change in IP address. However, the presence/absence of the change is not limited to the IP address. For example, the sequences may be different in accordance with the presence/absence of a change in setting information needed for wireless communication.

As described above, according to this embodiment, the communication apparatus stops redundant sending of service announcement packets to the protocol (WSD) that does not need to take the measure against the conflict of the service names when a plurality of IFs commonly manage a protocol service. This makes it possible to suppress a packet inquiry from a client that has received it to a self device.

Further, the service announcement packet of Bonjour and the WSD protocol are taken as the example of the communication protocols used in the above-described embodiment. However, the present invention does not limit the protocol and a packet type. Therefore, the present invention is applicable to other various protocols and may change the packet type in accordance with a protocol specification to be applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102851, filed May 23, 2016, which is hereby incorporated by reference herein in its entirety.

What is claimed is:

1. A communication apparatus establishing, in parallel, a first wireless connection for connecting to a first target apparatus via an external apparatus and second wireless connection for directly connecting to a second target apparatus without the external apparatus, the communication apparatus comprising:

a processor executing instructions to use a first communication protocol needing an anti-conflict measure or a second communication protocol not needing the anti-conflict measure, wherein in a case where overlap of setting information used in the communication by the first communication protocol occurs, the anti-conflict measure resolves the overlap of the setting information, and wherein in a case where the communication apparatus and the second target apparatus communicate by using the second communication protocol, the second target apparatus sends inquiry information to the communication apparatus based on reception of predetermined information by the second target apparatus;

a first controller configured to, in a case where the first communication protocol is used, after the first wireless connection has been disconnected during the first wireless connection and the second wireless connection being maintained in parallel, send information for stopping the communication to the second target apparatus, and then perform reconnection processing with the first target apparatus and notify the second target apparatus of information related to reconnection; and a second controller configured to, in a case where the second communication protocol is used, after the first wireless connection has been disconnected during the first wireless connection and the second wireless connection being maintained in parallel, perform reconnection processing with the first target apparatus without notifying the second target apparatus of information related to reconnection.

2. The communication apparatus according to claim 1, wherein the second controller notifies the second target apparatus of the information related to reconnection after the information for stopping the communication has been sent to the second target apparatus if a communication setting is changed, and the second communication protocol is used in the wireless communication, and wherein the second controller does not notify the second target apparatus of the information related to reconnection if the communication setting is not changed, and the second communication protocol is used.

3. The communication apparatus according to claim 1, wherein the first communication protocol is a Bonjour protocol.

4. The communication apparatus according to claim 1, wherein the second communication protocol is WSD (Windows Service Discovery).

5. The communication apparatus according to claim 1, wherein a communication setting is a setting commonly used in an infrastructure mode and a peer-to-peer mode.

6. The communication apparatus according to claim 2, wherein the communication setting is an IP address.

7. A communication method in a communication apparatus establishing, in parallel, a first wireless connection for connecting to a first target apparatus via an external apparatus and second wireless connection for directly connecting to a second target apparatus without the external apparatus, the method comprising:

using a first communication protocol needing an anti-conflict measure or a second communication protocol not needing the anti-conflict measure, wherein in a case where overlap of setting information used in the communication by the first communication protocol occurs, the anti-conflict measure resolves the overlap of the setting information, and wherein in a case where the communication apparatus and the second target apparatus communicate by using the second communication protocol, the second target apparatus sends inquiry information to the communication apparatus based on reception of predetermined information by the second target apparatus;

in a case where the first communication protocol is used, after the first wireless connection has been disconnected during the first wireless connection and the second wireless connection being maintained in parallel, sending information for stopping the communication to the second target apparatus, and then performing reconnection processing with the first target apparatus and notifying the second target apparatus of information related to reconnection; and in a case where the second communication protocol is used, after the first wireless connection has been disconnected during the first wireless connection and the second wireless connection being maintained in parallel, performing reconnection processing with the first target apparatus without notifying the second target apparatus of the information related to reconnection.

8. The method according to claim 7, wherein the first target apparatus and the second target apparatus are notified of the reconnection after connection with the second target apparatus is disconnected if the communication setting is changed, and the second communication protocol is used in the wireless communication.

9. The method according to claim 7, wherein the first communication protocol is a Bonjour protocol.

10. The method according to claim 7, wherein the second communication protocol is WSD (Windows Service Discovery).

11. The method according to claim 7, wherein the communication setting is a setting commonly used in an infrastructure mode and a peer-to-peer mode.

12. The method according to claim 8, wherein the communication setting is an IP address.

13. The communication apparatus according to claim 1, wherein the communication apparatus performs printing apparatus using ink supplied from an ink tank.

14. The communication apparatus according to claim 13, wherein the communication apparatus can use a channel in a 2.4-GHz frequency band and a channel in a 5-GHz frequency band.

15. The communication apparatus according to claim 1, wherein the external apparatus is an access point.

16. The communication apparatus according to claim 1, wherein in a case where the communication apparatus and the second target apparatus communicate by using the second communication protocol, the second target apparatus sends, to the communication apparatus, a Transfer/Get command as the inquiry information based on reception of a Hello command as the predetermined command by the second target apparatus.

17. The communication apparatus according to claim 1, wherein a Bye command as the information for stopping the communication is sent to the second target apparatus.

18. The method according to claim 7, wherein the communication apparatus performs printing apparatus using ink supplied from an ink tank.

19. The method according to claim 7, wherein the communication apparatus can use a channel in a 2.4-GHz frequency band and a channel in a 5-GHz frequency band.

20. The method according to claim 7, wherein the external apparatus is an access point.

21. The method according to claim 7, wherein in a case where the communication apparatus and the second target apparatus communicate by using the second communication protocol, the second target apparatus sends, to the communication apparatus, a Transfer/Get command as the inquiry information based on reception of a Hello command as the predetermined command by the second target apparatus.

22. The method according to claim 7, wherein a Bye command as the information to stop communication is sent to the second target apparatus.

23. A communication method in a communication apparatus establishing, in parallel, a first wireless connection for connecting to a first target apparatus via an external apparatus and second wireless connection for directly connecting to a second target apparatus without the external apparatus, the method comprising:

using a Bonjour protocol or a WSD (Windows Service Discovery) protocol, wherein in a case where the communication apparatus and the second target apparatus communicate by using the WSD protocol, the second target apparatus sends inquiry information to the communication apparatus based on reception of a predetermined information by the second target apparatus;

in a case where the Bonjour protocol is used, after the first wireless connection has been disconnected during the first wireless connection and the second wireless connection being maintained in parallel, sending information to stop communication to the second target apparatus, and then performing reconnection processing with the first target apparatus and notifying the second target apparatus of information related to reconnection; and in a case where the WSD protocol is used, after the first wireless connection has been disconnected during the first wireless connection and the second wireless connection being maintained in parallel, performing reconnection processing with the first target apparatus without notifying the second target apparatus of information related to reconnection.

24. The method according to claim 23, wherein the communication apparatus performs printing apparatus using ink supplied from an ink tank.

25. The method according to claim 23, wherein the communication apparatus can use a channel in a 2.4-GHz frequency band and a channel in a 5-GHz frequency band.

26. The method according to claim 23, wherein the external apparatus is an access point.

27. The method according to claim 23, wherein in a case where the communication apparatus and the second target apparatus communicate by using the WSD protocol, the second target apparatus sends, to the communication apparatus, a Transfer/Get command as the inquiry information based on reception of a Hello command as the predetermined command by the second target apparatus.

28. The method according to claim 23, wherein a Bye command as the information to stop communication is sent to the second target apparatus.

* * * * *